United States Patent [19]
Woolf

[11] Patent Number: 5,897,694
[45] Date of Patent: Apr. 27, 1999

[54] METHODS FOR IMPROVING THE ADHESION AND/OR COLORFASTNESS OF INK JET INKS WITH RESPECT TO SUBSTRATES APPLIED THERETO, AND COMPOSITIONS USEFUL THEREFOR

[75] Inventor: Jerome A. Woolf, San Diego, Calif.

[73] Assignee: Formulabs, Escondido, Calif.

[21] Appl. No.: 08/779,528

[22] Filed: Jan. 6, 1997

[51] Int. Cl.⁶ .................................................. C09D 11/02
[52] U.S. Cl. .................................. 106/31.27; 106/31.35; 106/31.6; 106/31.67; 428/195
[58] Field of Search ............................ 106/31.27, 31.35, 106/31.47, 31.57, 31.58, 31.59, 31.6, 31.67, 31.77, 31.85, 31.86, 31.89, 31.06; 428/195

[56] References Cited

U.S. PATENT DOCUMENTS

| | | | |
|---|---|---|---|
| 4,137,243 | 1/1979 | Farmer | 260/378 |
| 4,483,712 | 11/1984 | Murphy | 106/31.43 |
| 4,931,094 | 6/1990 | Barfurth et al. | 106/31.6 |
| 5,021,596 | 6/1991 | Barfurth et al. | 106/31.69 |
| 5,104,913 | 4/1992 | Sharma et al. | 523/339 |
| 5,108,503 | 4/1992 | Hindagolla et al. | 106/31.47 |
| 5,231,135 | 7/1993 | Machell et al. | 525/123 |
| 5,268,030 | 12/1993 | Floyd et al. | 106/450 |
| 5,389,132 | 2/1995 | Davulcu et al. | 106/31.58 |
| 5,529,616 | 6/1996 | Prasad | 106/31.86 |

*Primary Examiner*—Helene Klemanski
*Attorney, Agent, or Firm*—Gray Cary Ware & Freidenrich; Stephen E. Reiter

[57] ABSTRACT

In accordance with the present invention, it has been discovered that the adhesion properties and/or colorfastness of ink jet formulations when applied to a variety of substrates can be improved by adding a specific class of additives thereto. Invention formulations enable application of water-resistant (e.g., washable), colorfast images to a wide variety of substrates employing ink jet methodology.

35 Claims, No Drawings

METHODS FOR IMPROVING THE ADHESION AND/OR COLORFASTNESS OF INK JET INKS WITH RESPECT TO SUBSTRATES APPLIED THERETO, AND COMPOSITIONS USEFUL THEREFOR

FIELD OF THE INVENTION

The present invention relates to ink formulations suitable for use in ink jet applications, as well as methods for the use thereof, and articles produced therefrom. In a particular aspect, the present invention relates to ink jet formulations which have excellent adhesion and colorfast properties, i.e., invention inks are sufficiently resistant to removal that the ink can not readily be changed or removed from the substrate once applied thereto.

BACKGROUND OF THE INVENTION

Ink jet printing is a non-impact and non-contact printing method in which an electronic signal controls and directs droplets or a stream of ink that can be deposited on a wide variety of substrates. Ink jet printing is extremely versatile in terms of the variety of substrates that can be treated, as well as the print quality and the speed of operation that can be achieved. In addition, ink jet printing is digitally controllable. For these reasons, ink jet methodology has been widely adopted for industrial marking and labeling. In addition, ink jet methodology has also found widespread use in architectural and engineering design applications, medical imaging, office printing (of both text and graphics), geographical imaging systems (e.g., for seismic data analysis and mapping), signage, in display graphics (e.g., photographic reproduction, business and courtroom graphics, graphic arts), and the like.

Both dyes and pigments have been used as ink colorants for ink jet formulations. However, such materials do not always adhere well to the substrate to which the ink is applied. For example, dyes may dissolve upon contact with water. Thus, images applied employing ink jet methodology may tend to run or smear upon repeated contact, or may actually be removed from the printed surface if exposed to substantial quantities of aqueous media (e.g., if an ink jet printed article is laundered). Moreover, images applied employing ink jet methodology may also tend to fade or washout upon prolonged exposure to visible, ultraviolet and/or infrared light.

Accordingly, there is still a need in the art for ink jet formulations which have improved adhesion properties and/or colorfastness when printed on a variety of substrates.

BRIEF DESCRIPTION OF THE INVENTION

In accordance with the present invention, it has been discovered that the adhesion properties and/or colorfastness of ink jet formulations when applied to a variety of substrates can be improved by adding a specific class of additives thereto. Invention formulations enable application of water-resistant (e.g., washable), colorfast images to a wide variety of substrates employing ink jet methodology.

DETAILED DESCRIPTION OF THE INVENTION

In accordance with the present invention, there are provided methods to improve the adhesion properties and/or colorfastness of ink jet formulations when applied to a substrate, said method comprising adding to said ink jet formulation an amount of an additive effective to improve the adhesion and/or colorfastness of said ink jet formulation with respect to said substrate.

Ink jet formulations contemplated for use in the practice of the present invention typically comprise a diluent system and colorant. Both aqueous diluent systems and non-aqueous diluent systems can be employed in accordance with the invention.

Exemplary aqueous diluent systems contemplated for use in the practice of the present invention include:
  water containing in the range of about 0.5 up to about 3.0 wt % of a mixture of isopropyl alcohol and at least one alcohol having a boiling point of less than 130° C.,
  water containing in the range of about 2.5 up to about 25 wt % of pyrrolidone or a derivative thereof,
  water containing in the range of about 2 up to about 20 wt % of 1,3-propanediol or a derivative thereof,
  water containing in the range of about 1 up to about 50 wt % of a glycol ether,
  water containing in the range of about 5 up to about 25 wt % isopropyl alcohol, about 30 up to about 80 wt % of N-methyl pyrrolidone, and about 0 up to about 60 wt % of ethylene glycol monoethyl ether,
and the like.

Presently preferred aqueous diluent systems contemplated for use in the practice of the present invention include:
  compositions comprising:
    87.1 wt % distilled water, and
    5 wt % 2-pyrrolidone;
  compositions comprising:
    89 wt % distilled water, and
    4 wt % 2-pyrrolidone;
  compositions comprising:
    74.1 wt % distilled water,
    5 wt % glycerin,
    5 wt % thiodiglycol, and
    2 wt % diethylene glycol;
  compositions comprising:
    90.6 wt % distilled water, and
    4.1 wt % 2-pyrrolidone;
  compositions comprising:
    86.8 wt % distilled water, and
    4 wt % polyethylene glycol 400;
  compositions comprising:
    15.4 wt % water,
    7.6 wt % isopropyl alcohol,
    61.0 wt % N-methyl pyrrolidone, and
    13.7 wt % ethylene glycol monoethyl ether,
and the like.

Exemplary non-aqueous diluent systems contemplated for use in the practice of the present invention include methyl lactate, ethyl lactate, butyl lactate, isopropyl lactate, diacetone alcohol, ethylene glycol, diethylene glycol, triethylene glycol, 1,3-butylene glycol, 1,5-pentanediol, isophorone, xylene, mineral spirits, aromatic 100, glycerol, ethylene glycol monomethyl ether, propylene glycol monomethyl ether, diethylene glycol mono n-hexyl ether, and the like, as well as mixtures of any two or more thereof.

Additives contemplated for use in the practice of the present invention are typically chelates of transition metals (or chelates of mixtures of transition metals). Chelates contemplated for use herein include chelates of alpha-hydroxy carboxylic acid ligands, e.g., derivatives of caprylic acid, capric acid, citric acid (e.g., zirconium sodium citrate), lactic acid (e.g., zirconium lactate, zirconium ammonium lactate, zirconium triethanolamine lactate, zirconium diisopropylamine lactate, zirconium sodium trilactate, and the like), lauric acid, myristic acid, palmitic acid, stearic acid, tartaric acid (e.g., zirconium sodium tartrate), cyclohexanecarboxylic acid, and the like, as well as derivatives of boric acid, ammonium complexes (e.g., zirconium monoalkylammonium complex, zirconium dialkylammonium complex, zirconium trialkylammonium complex, zirconium triethanolamine complex, and the like), and the like, as well as mixtures of any two or more thereof.

Exemplary transition metals (or mixtures thereof) contemplated for use herein include Ti, V, Cr, Mn, Fe, Co, Ni, Cu, Zr, Nb, Mo, Ru, Rh, Pd, W, Ti—Ni, Ni—Cr, Fe—Co, Ti—W, Fe—Ti, Fe—Ni, Fe—Cr, Fe—Ni—Cr, Mo—Si, W—Si, and the like.

A presently preferred additive contemplated for use in accordance with the present invention is zirconium lactate.

As readily recognized by those of skill in the art, additives employed in accordance with the present invention can be added over a wide range. Typically, in the range of about 0.001 up to about 20 wt % of additive, based on the total weight of the treated ink jet formulation, is employed. It is presently preferred that in the range of about 0.005 wt % up to about 5 wt % of said additive be employed, with in the range of about 0.01 wt % up to about 0.2 wt % of said additive being the presently most preferred range.

A wide variety of substrates are contemplated for use in the practice of the present invention, e.g., papers, fabrics, polymeric films, cellulosic films, glasses, metals, sintered metals, woods, carbon-based materials, ceramics, and the like.

Exemplary papers contemplated for use in the practice of the present invention include ragbond papers, coated papers (e.g., matte papers, semigloss papers, clear film papers, high gloss photographic papers, semi-gloss photographic papers, latex papers, color inkjet papers, presentation papers, and the like), heavy coated papers, opaque bond papers, translucent bond papers, vellum, papers treated for ink, dye or colorant receptivity, and the like.

Fabrics contemplated for use in the practice of the present invention include any fabric prepared from fibers which (naturally or by post-treatment) contain free hydroxyl and/or free carboxyl groups. Exemplary fibers from which suitable fabrics can be prepared include 100% cotton, cotton/polyester blends, polyesters, silks, rayons, wools, polyamides, nylons, aramids, acrylics, modacrylics, polyolefins, spandex, saran, linens, hemps, jutes, sisals, latexes, butyl rubbers, vinyls, polyamide fibers, aluminum, stainless steel, novoloids, fabrics treated for ink, dye or colorant receptivity, and the like, as well as combinations of any two or more thereof.

Exemplary polymeric films include poly(acrylonitrile), poly(butadiene styrene), polycarbonate, polyester treated for ink, dye or colorant receptivity, and the like.

Exemplary cellulosic films include cellulose acetate, cellophane, cellulose acetate butyrate, cellulose triacetate, ethyl cellulose, cellulose nitrate, rayons, and the like.

Exemplary metal substrates include steel, stainless steel, ferritic stainless steel, aluminum, chromium oxide, iron oxide, iron cobalt, nickel, chromium, molybdenum, tungsten, magnetite, nickel oxide, cobalt oxide, vanadium oxide, titanium oxide, zirconium oxide, silicon oxide, tin oxide, and the like.

An exemplary sintered metal substrate contemplated for use in the practice of the present invention is tungsten carbide.

A wide variety of ceramic substrates are contemplated for use in the practice of the present invention, including structural ceramic materials, piezoelectric materials, glass ceramics, magnetic ceramics, cermets, nonlinear dielectric ceramics, refractory ceramics, dry-film lubricants, composite materials, and the like. Examples of such materials include oxides (e.g., aluminum oxide, chromium oxide, iron oxide, nickel oxide, cobalt oxide, vanadium oxide, titanium oxide, zirconium oxide, silicon oxide, tin oxide, and the like), carbides (e.g., silicon carbide, hafnium carbide, and the like), borides, nitrides, silicides (e.g., molybdenum disilicide) titanates (e.g., barium titanate, lead-zirconium titanate, and the like), ferrites (e.g., barium ferrite, lead ferrite, strontium ferrite, nickel-zinc ferrite, manganese ferrite, and the like), niobates (e.g., lead niobate), sulfides (e.g., molybdenum disulfide), and the like, as well as mixtures of any two or more thereof.

In accordance with another embodiment of the present invention, there are provided ink jet formulations comprising:

colorant, a diluent system, and an amount of an additive effective to improve the adhesion properties and/or colorfastness of said colorant with respect to a substrate to which it is applied.

As recognized by those of skill in the art, a variety of colorants can be employed for the preparation of ink jet formulations of the invention. Examples include pigment dispersions, dyes or polymeric colorants.

Example pigment dispersions include dispersions of one or more of phthalocyanine blue, carbon black, mars black, quinacridone magenta, ivory black, prussian blue, cobalt blue, ultramarine blue, manganese blue, cerulean blue, indathrone blue, chromium oxide, viridian, cobalt green, terre verte, nickel azo yellow, light green oxide, phthalocyanine green-chlorinated copper phthalocyanine, burnt sienna, perinone orange, irgazin orange, quinacridone magenta, cobalt violet, ultramarine violet, manganese violet, dioxazine violet, zinc white, titanium white, flake white, aluminum hydrate, blanc fixe, china clay, lithophone, arylide yellow G, arylide yellow 10G, barium chromate, chrome yellow, chrome lemon, zinc yellow, cadmium yellow, aureolin, naples yellow, nickel titanate, arylide yellow GX, isoindolinone yellow, flavanthrone yellow, yellow ochre, chromophytal yellow 8GN, toluidine red, quinacridone red, permanent crimson, rose madder, alizarin crimson, vermillion, cadmium red, permanent red FRG, brominated anthranthrone, naphthol carbamide, perylene red, quinacridone red, chromophthal red BRN, chromophthal scarlet R, aluminum oxide, barium oxide, bismuth oxide, boric oxide, cadmium oxide, calcium oxide, cerium oxide, chromium oxide, cobalt oxide, copper oxide, iridium oxide, lead oxide, magnesium oxide, manganese oxide, nickel oxide, phosphorus oxide, potassium oxide, rutile, silicon oxide, silver oxide, sodium oxide, strontium oxide, tin oxide, titanium oxide, vanadium oxide, zinc oxide, zirconium oxide, and the like.

When the colorant component of compositions according to the invention comprise pigment dispersions, typically in the range of about 6 up to about 20 wt % of said pigment is employed.

Example dyes employed for the preparation of ink jet formulations according to invention include C.I. Food Blacks (e.g., C.I. Food Black 1, C.I. Food Black 2, and the like), C.I. Acid Blacks (e.g., C.I. Acid Black 2, C.I. Acid Black 7, C.I. Acid Black 24, C.I. Acid Black 26, C.I. Acid Black 48, C.I. Acid Black 52, C.I. Acid Black 58, C.I. Acid Black 60, C.I. Acid Black 107, C.I. Acid Black 109, C.I. Acid Black 118, C.I. Acid Black 119, C.I. Acid Black 131, C.I. Acid Black 140, C.I. Acid Black 155, C.I. Acid Black 156, C.I. Acid Black 187, and the like), C.I. Direct Blacks (e.g., C.I. Direct Black 17, C.I. Direct Black 19, C.I. Direct Black 32, C.I. Direct Black 38, C.I. Direct Black 51, C.I. Direct Black 71, C.I. Direct Black 74, C.I. Direct Black 75, C.I. Direct Black 112, C.I. Direct Black 117, C.I. Direct Black 154, C.I. Direct Black 163, C.I. Direct Black 168, and the like), C.I. Reactive Blacks (e.g., C.I. Reactive Black 005, and the like), C.I. Acid Reds (e.g., C.I. Acid Red 1, C.I. Acid Red 8, C.I. Acid Red 17, C.I. Acid Red 32, C.I. Acid Red 35, C.I. Acid Red 37, C.I. Acid Red 42, C.I. Acid Red 57, C.I. Acid Red 92, C.I. Acid Red 115, C.I. Acid Red 119, C.I. Acid Red 131, C.I. Acid Red 133, C.I. Acid Red 134, C.I. Acid Red 154, C.I. Acid Red 186, C.I. Acid Red 249, C.I. Acid Red 254, C.I. Acid Red 256, and the like), C.I. Direct Reds (e.g., C.I. Direct Red 37, C.I. Direct Red 63, C.I. Direct Red 75, C.I. Direct Red 79, C.I. Direct Red 80, C.I. Direct Red 83, C.I. Direct Red 99, C.I. Direct Red 220, C.I. Direct Red 224, C.I. Direct Red 227, and the like), C.I. Acid Violets (e.g., C.I. Acid Violet 11, C.I. Acid Violet 34, C.I. Acid Violet 75, and the like), C.I. Direct Violets (e.g., C.I. Direct Violet 47, C.I. Direct Violet 48, C.I. Direct Violet 51, C.I. Direct Violet 90, C.I. Direct Violet 94, C.I. Direct Violet 99, and the like), C.I. Reactive Reds (e.g., C.I. Reactive Red 4, C.I. Reactive Red 23, C.I. Reactive Red 24, C.I. Reactive Red 31, C.I. Reactive Red 56, C.I. Reactive Red 120, C.I. Reactive Red 159, C.I. Reactive Red 180, C.I. Reactive Red 187, Reactive Red 195, and the like), C.I. Acid Blues (e.g., C.I. Acid Blue 9, C.I. Acid Blue 29, C.I. Acid Blue 62, C.I. Acid Blue 102, C.I. Acid Blue 104, C.I. Acid Blue 113, C.I. Acid Blue 117, C.I. Acid Blue 120, C.I. Acid Blue 175, C.I. Acid Blue 183, and the like), C.I. Direct Blues (e.g., C.I. Direct Blue 1, C.I. Direct Blue 6, C.I. Direct Blue 8, C.I. Direct Blue 15, C.I. Direct Blue 25, C.I. Direct Blue 71, C.I. Direct Blue 76, C.I. Direct Blue 78, C.I. Direct Blue 80, C.I. Direct Blue 86, C.I. Direct Blue 90, C.I. Direct Blue 106, C.I. Direct Blue 108, C.I. Direct Blue 123, C.I. Direct Blue 163, C.I. Direct Blue 165, C.I. Direct Blue 199, C.I. Direct Blue 226, and the like), C.I. Reactive Blues (e.g., C.I. Reactive Blue 7, C.I. Reactive Blue 13, Reactive Blue 21, and the like), C.I. Acid Yellows (e.g., C.I. Acid Yellow 3, C.I. Acid Yellow 17, C.I. Acid Yellow 19, C.I. Acid Yellow 23, C.I. Acid Yellow 25, C.I. Acid Yellow 29, C.I. Acid Yellow 38, C.I. Acid Yellow 49, C.I. Acid Yellow 59, C.I. Acid Yellow 61, C.I. Acid Yellow 72, and the like), C.I. Direct Yellows (e.g., C.I. Direct Yellow 11, C.I. Direct Yellow 27, C.I. Direct Yellow 28, C.I. Direct Yellow 33, C.I. Direct Yellow 39, C.I. Direct Yellow 58, C.I. Direct Yellow 86, C.I. Direct Yellow 100, C.I. Direct Yellow 142, and the like), C.I. Reactive Yellows (e.g., C.I. Reactive Yellow 2).

When the colorant component of compositions according to the invention contains a dye as the colorant, typically in the range of about 4 up to about 20 wt % of said dye is employed.

A wide variety of polymeric colorants are contemplated for use in the practice of the present invention. Exemplary polymeric colorants include materials having the general formula:

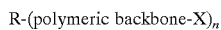

R-(polymeric backbone-X)$_n$ wherein:

R is an organic dyestuff radical, the polymeric backbone is as defined hereinafter, X is a reactive moiety, and n is an integer falling in the range of 1 up to about 6.

Organic dyestuff radicals contemplated for use herein include any of the structural families of dyes commonly used in the art, e.g., nitroso, nitro, azo (including monoazo, diazo and triazo), diarylmethane, acridine, methine, thiazole, phthalocyanine, anthraquinone, azine, oxazine, xanthene, indamine, and the like).

Polymeric backbones contemplated for use herein include any suitable polymeric species which renders the resulting colorant liquid. Typical of such polymeric species which may be attached to the dyestuff radical are the polymeric epoxides (e.g., polyalkylene oxides, and copolymers thereof). Typical polyalkylene oxides and copolymers thereof which can be employed to provide colorants contemplated for use herein include polyethylene oxides, polypropylene oxides, polybutylene oxides, copolymers of ethylene oxide, propylene oxide and butylene oxide, as well as other copolymers, (e.g., block copolymers in which a majority of the polymeric backbone is polyethylene oxide, polypropylene oxide and/or butylene oxide).

In accordance with the present invention, reactive moiety, X, can be any pendant or terminal reactive group which is capable of linking the reactive colorant to a linking agent. Presently preferred reactive moieties include —OH, —NH$_2$ and —SH.

Additional polymeric colorants contemplated for use herein include an intimate mixture of (I) a water-insoluble polymeric colorant comprising a linear, thermoplastic, linear (crystalline, semi-crystalline or amorphous) polyester having copolymerized therein at least 5 weight percent, based on the weight of component I, of residues of one or more monomeric, organic colorant compounds, and (II) an ionic (preferably anionic) or amphoteric surfactant, optionally containing (III) a non-ionic poly(oxyalkylene) surfactant.

Typically, polymeric colorants employed in accordance with this aspect of the invention comprise (i) a diacid component comprising the residues of one or more aliphatic, alicyclic or aromatic dicarboxylic acids, (ii) a diol component comprising the residues of one or more aliphatic or alicyclic diols and (iii) a colorant component comprising the residues of one or more colorant compounds.

The ionic or amphoteric surfactants constituting component II of the above-described compositions can be selected from a wide variety of compounds, such as, for example, alkali salts of higher fatty acids (e.g., sodium stearate), glyceroyl esters, citric acid esters of monoglycerides, diacetylated tartaric acid esters of monoglycerides, sulfonated esters, and the like.

Exemplary polymeric colorants are described in U.S. Pat. No. 4,137,243, U.S. Pat. No. 5,104,913, and U.S. Pat. No. 5,231,135, each of which is hereby incorporated by reference herein in its entirety.

When the colorant component of compositions according to the invention contain a polymeric colorant as the colorant, typically in the range of about 1 up to about 12 wt % of said polymeric colorant is employed.

As readily recognized by those of skill in the art, ink jet formulations contemplated for use herein may optionally further comprise one or more of a biocide (e.g., a bactericide, a fungicide, an algicide, and the like), a surface active agent, a corrosion inhibitor, a pH adjusting agent, an aqueous diluent, a non-aqueous diluent, an ultraviolet absorber, an infrared absorber, and the like.

Presently preferred ink jet formulations which fall within the scope of the present invention include:

compositions comprising:
87.1 wt % distilled water,
5 wt % 2-pyrrolidone, 0.1 wt % Giv-Gard DXN (i.e., 2,6-dimethyl-m-dioxan-4-ol acetate; also known as 6-acetoxy-2,4-dimethyl-m-dioxane, available from Givaudan-Roure Corporation, Teaneck, N.J.),
0.1 wt % Cobratec 99 (i.e., benzotriazole, available from Cincinnati Specialties, Cincinnati, Ohio),
1 wt % Amp-95 (i.e., 2-amino-2-methyl-1-propanol 95%, available from Angus Chemical Company, Buffalo Grove, Ill.),
6.5 wt % Milliken polymeric blue colorant 10061-52 (available from Milliken Research Corporation, Spartanburg, S.C.) and
0.2 wt % zirconium lactate (available from Benchmark Research and Technology, Midland, Tex.);

compositions comprising:
89 wt % distilled water,
4 wt % 2-pyrrolidone,
0.1 wt % Giv-Gard DXN,
0.1 wt % Cobratec 99,
0.3 wt % Amp-95,
0.3 wt % Surfynol 465 (i.e., ethoxylated tetramethyldecynediol, available from Air Products and Chemicals, Inc., Allentown, Pa.),
6 wt % Spectra Fix Black MW-B (available from Spectra Colors, Kearny, N.J.), and
0.2 wt % zirconium lactate;

compositions comprising:
74.1 wt % distilled water,
5 wt % glycerin,
5 wt % thiodiglycol,
2 wt % diethylene glycol,
0.1 wt % Giv-Gard DXN,
1 wt Tergitol (i.e., alkyloxypolyethyleneoxy ethanol, available from Union Carbide Chemicals and Plastics, Industrial Chemicals Division, Danbury, Conn.),
0.1 wt % Cobratec 99,
0.5 wt % Amp-95,
11.9 wt % Basacid Yellow (available from BASF Corporation Colorants, Clifton, N.J.),
0.1 wt % Basacid Red (available from BASF Corporation Colorants, Clifton, N.J.), and
0.2 wt % zirconium lactate;

compositions comprising:
90.6 wt % distilled water,
4.1 wt % 2-pyrrolidone,
0.2 wt % Giv-Gard DXN,
0.2 wt % Cobratec 99,
0.3 wt % Amp-95,
0.3 wt % Surfynol 465,
4.1 wt % Spectra Fix Red 195 (available from Spectra Colors, Kearny, N.J.), and
0.2 wt % zirconium lactate;

compositions comprising:
86.8 wt % distilled water,
4 wt % polyethylene glycol 400,
0.1 wt % Giv-Gard DXN,
0.1 wt % Cobratec 99,
12 wt % Amp-95,
7.8 wt % Milliken polymeric blue colorant 10061-52 (available from Milliken Research Corporation, Spartanburg, S.C.) and
0.2 wt % zirconium lactate, compositions comprising:
15.4 wt % distilled water,
7.6 wt % isopropyl alcohol,
61.0 wt % N-methyl pyrrolidone,
13.7 wt % ethylene glycol monoethyl ether,
0.1 wt % Giv-Gard DXN,
0.7 wt % Surfynol 465,
1.5 wt % Spectrasol Brilliant Blue GN (available from Spectra Colors, Kearny, N.J.), and
0.2 wt % zirconium lactate;

and the like.

In accordance with yet another embodiment of the present invention, there are provided articles produced by the above-described methods, employing ink jet formulations as described herein. Thus, according to the present invention, the ink jet image applied to a substrate as described herein resists removal from said substrate, even upon repeated contact therewith. Such repetitive contact can be the result of normal handling of an article, accidental exposure to liquid (e.g., a coffee spill), routine laundering of an article of clothing, and the like.

When articles according to the invention comprise a fabric substrate having an ink jet image printed thereon, the resulting image adheres sufficiently to said substrate to resist removal therefrom upon washing of said article. Thus, in contrast to the results with prior art ink jet formulations, which tend to readily wash off, the invention formulations enable one to achieve the benefits of ink jet technology, without compromising the ability of the deposited image to remain in place as applied.

Articles according to the present invention, i.e., substrate having an ink jet image printed thereon, also resist fading as a result of exposure to ultraviolet irradiation. Thus, in contrast to prior art formulations, which tend to fade as a result of exposure to ultraviolet radiation, invention articles display improved light fastness.

The invention will now be described in greater detail by reference to the following non-limiting examples.

EXAMPLE 1

A variety of ink jet formulations were prepared and applied to suitable fabric employing ink jet methodology, then washed several times to determine the ability of the ink to adhere to the fabric over extended exposure periods. The ink jet formulations tested are summarized below:

| Formula No. | Formulation |
| --- | --- |
| 1 | 91.4 wt % distilled water, 5 wt % 2-pyrrolidone, 0.1 wt % Giv-Gard DXN, 0.1 wt % Cobratec 99, 1 wt % Amp-95, and 2 wt % FD&C Yellow. |
| 2 | 74.3 wt % distilled water, 5 wt % glycerin, 5 wt % thiodiglycol, 2 wt % diethylene glycol, 0.1 wt % Giv-Gard DXN, 1 wt % Tergitol, 0.1 wt % Cobratec 99, 0.5 wt % Amp-95, 11.9 wt % Basacid Yellow, and 0.1 wt % Basacid Red. |
| 3 | 87.1 wt % distilled water, 5 wt % 2-pyrrolidone, 0.1 wt % Giv-Gard DXN, 0.1 wt % Cobratec 99, 1 wt % Amp-95, 6.5 wt % Milliken polymeric blue colorant 10061-52, and 0.2 wt % zirconium lactate. |

-continued

| Formula No. | Formulation |
|---|---|
| 4 | 89 wt % distilled water, 4 wt % 2-pyrrolidone, 0.1 wt % Giv-Gard DXN, 0.1 wt % Cobratec 99, 0.3 wt % Amp-95, 0.3 wt % Surfynol 465, 6 wt % Spectra Fix Black MW-B, and 0.2 wt % zirconium lactate. |
| 5 | 74.1 wt % distilled water, 5 wt % glycerin, 5 wt % thiodiglycol, 2 wt % diethylene glycol, 0.1 wt % Giv-Gard DXN, 1 wt % Tergitol, 0.1 wt % Cobratec 99, 0.5 wt % Amp-95, 11.9 wt % Basacid Yellow, 0.1 wt % Basacid Red, and 0.2 wt % zirconium lactate. |
| 6 | 90.6 wt % distilled water, 4.1 wt % 2-pyrrolidone, 0.2 wt % Giv-Gard DXN, 0.2 wt % Cobratec 99, 0.3 wt % Amp-95, 0.3 wt % Surfynol 465, 4.1 wt % Spectra Fix Red 195, and 0.2 wt % zirconium lactate. |
| 7 | 86.8 wt % distilled water, 4 wt % polyethylene glycol 400, 0.1 wt % Giv-Gard DXN, 0.1 wt % Cobratec 99, 12 wt % Amp-95, 7.8 wt % Milliken polymeric blue colorant 10061-52, and 0.2 wt % zirconium lactate. |

Each of the above-described formulations were applied to 100% cotton fabric, or to a 50/50 cotton polyester fabric, then washed three times using a normal wash cycle, in warm water (i.e., 35° C., 95° F.) with the recommended amount of Tide detergent (according to manufacturer's directions). The resulting articles were then visually inspected to determine the ability of the ink to adhere to the fabric over repeated wash cycles.

Visual inspection is conducted by an individual knowledgeable in the textile arts (i.e., one with a sensitive eye for image sharpness, color brightness, etc). While the standard used in this field is generally a subjective one, the subjective evaluation of acceptable image can commonly be correlated with a threshold of $\leq 30\%$ loss in color intensity and/or color value. Conversely, $\geq 30\%$ loss in color intensity and/or color value generally correlates with the occurrence of unacceptably faded and/or washed-out images.

After only three washes, the ink jet applied design was no longer distinguishable on articles prepared using ink formulations 1 and 2 (i.e., the design had substantially faded into the background on these articles). In contrast, after the same number of wash cycles, articles prepared using ink formulations 3–7 each retained the ink jet applied image with good clarity and vibrance.

While the invention has been described in detail with reference to certain preferred embodiments thereof, it will be understood that modifications and variations are within the spirit and scope of that which is described and claimed.

That which is claimed is:

1. A method to improve the adhesion of an ink jet formulation to a substrate, said method comprising adding to said ink jet formulation an amount of a chelate of a transition metal or a chelate of a mixture of transition metals effective to improve the adhesion of said ink jet formulation to said substrate.

2. A method according to claim 1 wherein said ink jet formulation comprises a diluent system and colorant.

3. A method according to claim 2 wherein said diluent system is an aqueous diluent system or a non-aqueous diluent system.

4. A method according to claim 3 wherein said aqueous diluent system is selected from the group consisting of:
water containing in the range of about 0.5 up to about 3.0 wt % of a mixture of isopropyl alcohol and at least one alcohol having a boiling point of less than 130° C.,
water containing in the range of about 2.5 up to about 25 wt % of pyrrolidone or a derivative thereof,
water containing in the range of about 2 up to about 20 wt % of 1,3-propanediol or a derivative thereof,
water containing in the range of about 1 up to about 50 wt % of a glycol ether, and
water containing in the range of about 5 up to about 25 wt % isopropyl alcohol, about 30 up to about 80 wt % of N-methyl pyrrolidone, and about 0 up to about 60 wt % of ethylene glycol monoethyl ether.

5. A method according to claim 4 wherein said aqueous diluent system is selected from the group consisting of:
a composition comprising:
87.1 wt % distilled water, and
5 wt % 2-pyrrolidone;
a composition comprising:
89 wt % distilled water, and
4 wt % 2-pyrrolidone;
a composition comprising:
74.1 wt % distilled water,
5 wt % glycerin,
5 wt % thiodiglycol, and
2 wt % diethylene glycol;
a composition comprising:
90.6 wt % distilled water, and
4.1 wt % 2-pyrrolidone;
a composition comprising:
86.8 wt % distilled water, and
4 wt % polyethylene glycol 400, and
a composition comprising:
15.4 wt % distilled water,
7.6 wt % isopropyl alcohol,
61.0 wt % N-methyl pyrrolidone, and
13.7 wt % ethylene glycol monoethyl ether.

6. A method according to claim 3 wherein said non-aqueous diluent system comprises methyl lactate, ethyl lactate, butyl lactate, isopropyl lactate, diacetone alcohol, ethylene glycol, diethylene glycol, triethylene glycol, 1,3-butylene glycol, 1,5-pentanediol, isophorone, xylene, mineral spirits, an aromatic distillation fraction, glycerol, ethylene glycol monomethyl ether, propylene glycol monomethyl ether, diethylene glycol mono n-hexyl ether, or a mixture of any two or more thereof.

7. A method according to claim 1 wherein said substrate is paper, fabric, a polymeric film, a cellulosic film, glass, metal, wood, vellum or carbon.

8. A method according to claim 7 wherein said fabric contains free hydroxyl and/or free carboxyl groups.

9. A method according to claim 7 wherein said fabric is 100% cotton, a cotton/polyester blend, silk, rayon, wool, nylon, latex, butyl rubber, vinyl or a polyamide fiber.

10. A method according to claim 7 wherein said paper is ragbond paper, coated paper or emulsion coated paper.

11. A method according to claim 1 wherein said chelate is a derivative of caprylic acid, capric acid, citric acid, lactic acid, lauric acid, myristic acid, palmitic acid, stearic acid, tartaric acid, cyclohexanecarboxylic acid, boric acid, or an ammonium complex.

12. A method according to claim 1 wherein said transition metal or mixture of transition metals is selected from the group consisting of Ti, V, Cr, Mn, Fe, Co, Ni, Cu, Zr, Nb, Mo, R, Rh, Pd, W, Ti—Ni, Ni—Cr, Fe—Co, Ti—W, Fe—Ti, Fe—Ni, Fe—Cr, Fe—Ni—Cr, Mo—Si and W—Si.

13. A method according to claim 1 wherein said chelate is present in the range of about 0.001 up to about 20 wt %, based on the total weight of the treated ink jet formulation.

14. A method according to claim 1 wherein said chelate is zirconium lactate.

15. A method according to claim 1 wherein the ink jet formulation is selected from the group consisting of:
  a composition comprising:
    87.1 wt % distilled water,
    5 wt % 2-pyrrolidone,
    0.1 wt % biocide,
    0.1 wt % anticorrosive,
    1 wt % buffer,
    6.5 wt % polymeric colorant, and
    0.2 wt % zirconium lactate;
  a composition comprising:
    89 wt % distilled water,
    4 wt % 2-pyrrolidone,
    0.1 wt % biocide,
    0.1 wt % anticorrosive,
    0.3 wt % buffer,
    0.3 wt % surfactant,
    6 wt % reactive black dye, and
    0.2 wt % zirconium lactate;
  a composition comprising:
    74.1 wt % distilled water,
    5 wt % glycerin,
    5 wt % thiodiglycol,
    2 wt % diethylene glycol,
    0.1 wt % biocide,
    1 wt % surfactant,
    0.1 wt % anticorrosive,
    0.5 wt % buffer,
    11.9 wt % acid yellow dye,
    0.1 wt % acid red dye, and
    0.2 wt % zirconium lactate;
  a composition comprising:
    90.6 wt % distilled water,
    4.1 wt % 2-pyrrolidone,
    0.2 wt % biocide,
    0.2 wt % anticorrosive,
    0.3 wt % buffer,
    0.3 wt % surfactant,
    4.1 wt % reactive red dye, and
    0.2 wt % zirconium lactate;
  a composition comprising:
    86.8 wt % distilled water,
    4 wt % polyethylene glycol 400,
    0.1 wt % biocide,
    0.1 wt % anticorrosive,
    12 wt % buffer,
    7.8 wt % polymeric colorant, and
    0.2 wt % zirconium lactate; and
  a composition comprising:
    15.4 wt % distilled water,
    7.6 wt % isopropyl alcohol,
    61.0 wt % N-methyl pyrrolidone,
    13.7 wt % ethylene glycol monoethyl ether,
    0.1 wt % biocide,
    0.7 wt % surfactant,
    1.5 wt % phthalocyanine blue dye, and
    0.2 wt % zirconium lactate.

16. An ink jet formulation comprising:
  colorant,
  a diluent system, and
  an amount of a chelate of a transition metal or a chelate of a mixture of transition metals effective to improve the adhesion of said colorant to a substrate to which it is applied.

17. An ink jet formulation according to claim 16 wherein said chelate is a derivative of caprylic acid, capric acid, citric acid, lactic acid, lauric acid, myristic acid, palmitic acid, stearic acid, tartaric acid, cyclohexanecarboxylic acid, boric acid or an ammonium complex.

18. An ink jet formulation according to claim 16 wherein said transition metal or mixture of transition metals is selected from the group consisting of Ti, V, Cr, M, Fe, Co, Ni, Cu, Zr, Nb, Mo, Ru, Rh, Pd, W, Ti—Ni, Ni—Cr, Fe—Co, Ti—W, Fe—Ti, Fe—Ni, Fe—Cr, Fe—Ni—Cr, Mo—Si and W—Si.

19. An ink jet formulation according to claim 16 wherein said formulation contains in the range of about 0.001 up to about 20 wt % of said chelate.

20. An ink jet formulation according to claim 16 wherein said colorant is a dispersion of a pigment, a dye or a polymeric colorant.

21. An ink jet formulation according to claim 20 wherein said dispersion is a dispersion of phthalocyanine blue, carbon black, mars black, quinacridone magenta, ivory black, prussian blue, cobalt blue, ultramarine blue, manganese blue, cerulean blue, indathrone blue, chromium oxide, viridian, cobalt green, terre verte, nickel azo yellow, light green oxide, phthalocyanine green-chlorinated copper phthalocyanine, burnt sienna, perinone orange, irgazin orange, quinacridone magenta, cobalt violet, ultramarine violet, manganese violet, dioxazine violet, zinc white, titanium white, flake white, aluminum hydrate, blanc fixe, china clay, lithophone, arylide yellow G, arylide yellow 10G, barium chromate, chrome yellow, chrome lemon, zinc yellow, cadmium yellow, aureolin, naples yellow, nickel titanate, arylide yellow GX, isoindolinone yellow, flavanthrone yellow, yellow ochre, chromophytal yellow 8GN, toluidine red, quinacridone red, permanent crimson, rose madder, alizarin crimson, vermillion, cadmium red, permanent red FRG, brominated anthranthrone, naphthol carbamide, perylene red, quinacridone red, chromophthal red BRN, chromophthal scarlet R, aluminum oxide, barium oxide, bismuth oxide, boric oxide, cadmium oxide, calcium oxide, cerium oxide, chromium oxide, cobalt oxide, copper oxide, iridium oxide, lead oxide, magnesium oxide, manganese oxide, nickel oxide, phosphorus oxide, potassium oxide, rutile, silicon oxide, silver oxide, sodium oxide, strontium oxide, tin oxide, titanium oxide, vanadium oxide, zinc oxide, zirconium oxide, or a mixture of any two or more thereof.

22. An ink jet formulation according to claim 21 wherein said formulation contains in the range of about 6 up to about 20 wt % of said pigment.

23. An ink jet formulation according to claim 20 wherein said dye is a C.I. Food Black, a C.I. Acid Black, a C.I. Direct Black, a C.I. Reactive Black, a C.I. Acid Red, a C.I. Direct Red, a C.I. Acid Violet, a C.I. Direct Violet, a C.I. Reactive Red, a C.I. Acid Blue, a C.I. Direct Blue, a C.I. Reactive Blue, a C.I. Acid Yellow, a C.I. Direct Yellow, a C.I. Reactive Yellow, or a mixture of any two or more thereof.

24. An ink jet formulation according to claim 23 wherein said formulation contains in the range of about 4 wt % up to about 20 wt % of said dye.

25. An ink jet formulation according to claim 20 wherein said polymeric colorant is selected from:
(a) materials having the general formula:

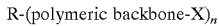

R-(polymeric backbone-X)$_n$ wherein:
R is an organic dyestuff radical,
the polymeric backbone is as defined hereinafter,
X is a reactive moiety, and
n is an integer falling in the range of 1 up to about 6, or
(b) an intimate mixture of:
(I) a water-insoluble polymeric colorant comprising a linear, thermoplastic, linear polyester having copolymerized therein at least 5 weight percent, based on the weight of component I, of residues of one or more monomeric, organic colorant compounds, and
(II) an ionic or amphoteric surfactant, optionally containing
(III) a non-ionic poly(oxyalkylene) surfactant.

26. An ink jet formulation according to claim 25 wherein said formulation contains in the range of about 1 up to about 12 wt % of said polymeric colorant.

27. An ink jet formulation according to claim 16 wherein said diluent system is an aqueous diluent system or a non-aqueous diluent system.

28. An ink jet formulation according to claim 27 wherein said aqueous diluent system is selected from the group consisting of:
water containing in the range of about 0.5 up to about 3.0 wt % of a mixture of isopropyl alcohol and at least one alcohol having a boiling point of less than 130° C.,
water containing in the range of about 2.5 up to about 25 wt % of pyrrolidone or a derivative thereof,
water containing in the range of about 2 up to about 20 wt % of 1,3-propanediol or a derivative thereof, and
water containing in the range of about 1 up to about 50 wt % of a glycol ether, and
water containing in the range of about 5 up to about 25 wt % isopropyl alcohol, about 30 up to about 80 wt % of N-methyl pyrrolidone, and about 0 up to about 60 wt % of ethylene glycol monoethyl ether.

29. An ink jet formulation according to claim 28 wherein said aqueous diluent system is selected from the group consisting of:
a composition comprising:
87.1 wt % distilled water, and
5 wt % 2-pyrrolidone;
a composition comprising:
89 wt % distilled water, and
4 wt % 2-pyrrolidone;
a composition comprising:
74.1 wt % distilled water,
5 wt % glycerin,
5 wt % thiodiglycol, and
2 wt % diethylene glycol;
a composition comprising:
90.6 wt % distilled water, and
4.1 wt % 2-pyrrolidone;
a composition comprising:
86.8 wt % distilled water, and
4 wt % polyethylene glycol 400, and
a composition comprising:
15.4 wt % distilled water,
7.6 wt % isopropyl alcohol,
61.0 wt % N-methyl pyrrolidone, and
13.7 wt % ethylene glycol monoethyl ether.

30. An ink jet formulation according to claim 27 wherein said non-aqueous diluent system comprises methyl lactate, ethyl lactate, butyl lactate, isopropyl lactate, diacetone alcohol, ethylene glycol, diethylene glycol, triethylene glycol, 1,3-butylene glycol, 1,5-pentanediol, isophorone, xylene, mineral spirits, an aromatic distillation fraction, glycerol, ethylene glycol monomethyl ether, propylene glycol monomethyl ether, diethylene glycol mono n-hexyl ether, or a mixture of any two or more thereof.

31. An ink jet formulation according to claim 16 further comprising one or more of a biocide, a surface active agent, a corrosion inhibitor, a pH adjusting agent, an aqueous diluent, a non-aqueous diluent, an ultraviolet absorber or an infrared absorber.

32. An article produced by applying an ink jet formulation produced according to the method of claim 1 to a substrate.

33. A fabric substrate having an ink jet image printed thereon, wherein the image is printed with an ink jet formulation comprising an amount of a chelate of a transition metal or a chelate of a mixture of transition metals effective to improve the adhesion of said ink jet formulation to said substrate and wherein said image adheres sufficiently to said substrate to resist removal therefrom upon washing of said article.

34. A substrate having an ink jet image printed thereon, wherein the image is printed with an ink jet formulation comprising an amount of a chelate of a transition metal or a chelate of a mixture of transition metals effective to improve the adhesion of said ink jet formulation to said substrate and wherein said image resists removal from said substrate upon repeated contact therewith.

35. A substrate having an ink jet image printed thereon, wherein the image is printed with an ink jet formulation comprising an amount of a chelate of a transition metal or a chelate of a mixture of transition metals effective to improve the adhesion of said ink jet formulation to said substrate and wherein said image resists fading as a result of exposure to ultraviolet irradiation.

* * * * *